Sept. 15, 1925.

H. S. DILLS

ARTIFICIAL BAIT

Filed Aug. 14, 1922

1,553,933

Henry S. Dills INVENTOR.

BY

Elwin M. Hulse ATTORNEY.

Patented Sept. 15, 1925.

1,553,933

UNITED STATES PATENT OFFICE.

HENRY S. DILLS, OF GARRETT, INDIANA.

ARTIFICIAL BAIT.

Application filed August 14, 1923. Serial No. 661,710.

*To all whom it may concern:*

Be it known that I, HENRY S. DILLS, a citizen of the United States, residing at Garrett, in the county of De Kalb and State of Indiana, have invented new and useful Improvements in Artificial Baits, of which the following is a specification.

The invention relates to artificial baits. Its object is to provide a novel and simple and efficient bait having a strong resemblance to a live minnow, and also to provide a bait body with a novel form of tail or fin members having great durability.

Numerous forms of tails and fins have been attached to bait bodies to imitate a natural minnow, such as rubber, rubberized cloth, flannel, pork rind, but all such have their disadvantages, for instance, rubber rapidly deteriorates, flannel frays out rapidly, a pork rind is greasy and unpleasant to carry and handle and the salt in it causes rust to form on the hooks and upon other tackle carried in the tackle box. By my invention I overcome these objections and disadvantages and provide in addition a very attractive bait closely resembling a natural minnow.

Figure 1:
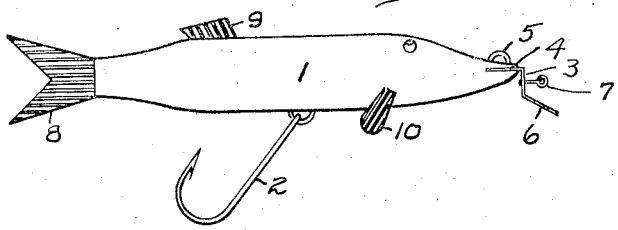
Figure 2:
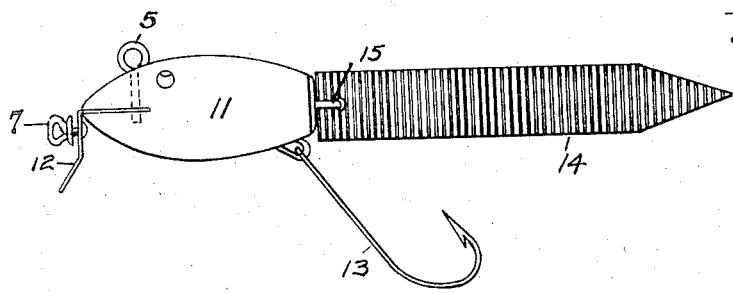

In the accompanying drawings I have illustrated the invention, in which Figure 1 is a side elevational view of a bait provided with the invention; Fig. 2 a side elevational view of another bait provided with a modified form of the invention and Fig. 3 a plan view of the bait illustrated in Fig. 2.

Referring to the drawings, 1 is the body of the bait having any shape or form as may be desired. Any number of hooks 2 may be secured to the body at suitable points, one hook only being shown for the sake of simplicity. At the forward end of the body is the controlling member formed of a vertical wall 3 with a rearwardly extending portion or section 4 adapted to be inserted into a slot formed in said end of the body and secured therein by the screw eye 5 inserted through the top of the body and through an opening in the said section 4. An inclined section 6 projects forwardly at a suitable angle from one edge of the wall and an eye 7 has a swivel connection to the wall 3, to which the line is attached. The controlling member regulates the depth to which the bait will travel when drawn through the water and it together with the vertical wall cause the bait to wiggle in imitation of the movements of a fish through the water. When the controlling member is turned over so that the section 6 projects upwardly and forwardly and the wall 3 projects upwardly from the section 4 the bait will remain on the surface of the water or near said surface and will produce a commotion in the water as it is drawn through the same. This construction of the controlling member or head piece is similar to that described in my previous Patent No. 1,352,054.

At the rear end of the body 1 a vertical slit is formed into which the tail piece 8 is inserted and secured. This tail piece is formed of suitable fabric such as gros-grain ribbon, the latter being preferred because of its close imitation to the natural tail. The tail piece is immersed in a suitable lacquer, such as celluloid lacquer, which not only preserves the fabric but also serves to secure the tail piece in the slot formed in the body. The fabric may be colored as desired.

A fin 9 of similar material is engaged in a slot formed in the top of the body 1 and fins 10, one on either side, may also be secured to the body at suitable points, the latter fins being formed of the same material. The body thus equipped with the tail piece and such fins as may be desired presents a very close resemblance to a natural minnow, and this, coupled with its movement through the water caused by the head piece, produces a very life like minnow in motion.

Figure 3:
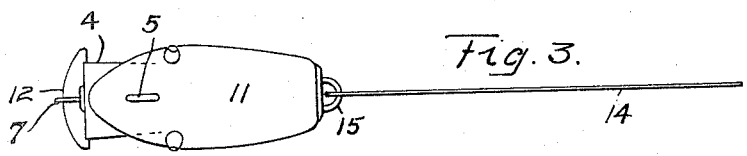

In Figs. 2 and 3, the body 11 is provided with the same head piece 12 and with a hook 13, and at the rear end is secured a ribbon 14 of the same material cut so that the ridges extend up and down. The ribbon is treated with the lacquer at its forward end in order to strengthen it at said point so that it will not readily tear off the ring or eye 15. It is also lacquered at the opposite end to avoid fraying of the material and it may also be lacquered at any other point desirable. The ribbon may be colored as desired. This elongated tail serves as a rind similarly to the common pork rind, but without the disadvantages of the latter. The lacquer is not essential but I have found that it adds materially to the life of the fabric.

In both embodiments of the invention the tail is free to wiggle rearwardly of the body as the bait is drawn through the water and causes the bait to be most life-like in action, the fins also having a limited movement.

What I claim is:

1. In a fish-bait, the combination of a body, and a lacquered ribbon formed of ribbed-fabric secured to the body for the purpose described.

2. In a fish-bait, the combination of a wooden body, having a vertical slot in its rear end and a lacquered gros-grain ribbon secured in said slot and projecting rearwardly therefrom.

In witness whereof I have hereunto subscribed my name this 9th day of August, 1922.

HENRY S. DILLS.